(12) United States Patent
Smith et al.

(10) Patent No.: US 10,026,581 B2
(45) Date of Patent: Jul. 17, 2018

(54) SWITCH OVERRIDE SYSTEM FOR RECREATION VEHICLE CONTROLS

(71) Applicant: ASA Electronics, LLC, Elkhart, IN (US)

(72) Inventors: Vince Smith, Bristol, IN (US); Gerald J. Maffetone, Edwardsburg, MI (US)

(73) Assignee: ASA Electronics, LLC, Elkhart, IN (US)

(*) Notice: Subject to any disclaimer, the term of this patent is extended or adjusted under 35 U.S.C. 154(b) by 205 days.

(21) Appl. No.: 15/062,416

(22) Filed: Mar. 7, 2016

(65) Prior Publication Data
US 2017/0047188 A1 Feb. 16, 2017

Related U.S. Application Data

(60) Provisional application No. 62/129,130, filed on Mar. 6, 2015.

(51) Int. Cl.
| | | |
|---|---|---|
| *H01H 89/00* | (2006.01) | |
| *B60P 3/34* | (2006.01) | |
| *B60R 16/023* | (2006.01) | |
| *E04H 15/08* | (2006.01) | |

(52) U.S. Cl.
CPC .............. *H01H 89/00* (2013.01); *B60P 3/34* (2013.01); *B60R 16/0231* (2013.01); *E04H 15/08* (2013.01)

(58) Field of Classification Search
CPC combination set(s) only.
See application file for complete search history.

(56) References Cited

U.S. PATENT DOCUMENTS

| | | | |
|---|---|---|---|
| 4,160,458 A | 7/1979 | Marcellus | |
| 4,500,132 A | 2/1985 | Yoder | |
| 5,237,782 A | 8/1993 | Cooper | |
| 5,630,460 A | 5/1997 | Yuan | |
| 5,848,629 A | 12/1998 | Baka | |
| 6,067,756 A | 5/2000 | Frerichs et al. | |
| 6,341,638 B1 | 1/2002 | Thompson et al. | |
| 6,345,854 B1 * | 2/2002 | McManus | B60P 3/34 296/165 |
| 6,471,275 B1 | 10/2002 | Kunz et al. | |
| 6,484,069 B2 | 11/2002 | Osinga | |
| 6,755,230 B2 | 6/2004 | Ulatowski et al. | |
| 7,093,888 B2 | 8/2006 | Anderson et al. | |
| 7,931,323 B1 | 4/2011 | Del Vecchio | |
| 8,047,152 B2 * | 11/2011 | Gai | B63B 1/22 114/285 |

(Continued)

*Primary Examiner* — Thomas G Black
*Assistant Examiner* — Ana D Thomas
(74) *Attorney, Agent, or Firm* — Taylor IP, P.C.

(57) ABSTRACT

A vehicle system including a housing, an extendable/retractable member coupled to the housing, an electrically controlled actuator and an override system. The electrically controlled actuator is connected to the extendable/retractable member, and is configured to extend and retract the extendable/retractable member relative to the housing. The override system includes a selector switch and an activation switch. The selector switch allows a selection of one of the plurality of electrically controlled actuators which is defined as a selected actuator. The activation switch activates the selected actuator to either extend or retract the extendable/retractable member associated with the selected actuator.

19 Claims, 3 Drawing Sheets

(56) References Cited

U.S. PATENT DOCUMENTS

| | | | |
|---|---|---|---|
| 8,527,160 B2* | 9/2013 | Fox | F16H 61/0202 |
| | | | 701/51 |
| 8,887,785 B2 | 11/2014 | Goth | |
| 8,991,890 B2 | 3/2015 | Kreil | |
| 9,429,944 B2* | 8/2016 | Filippov | H04L 67/12 |
| 9,679,735 B2* | 6/2017 | Smith | H01H 89/00 |
| 9,796,269 B2* | 10/2017 | Bouaziz | B60K 37/06 |
| 2002/0086770 A1* | 7/2002 | Fischer | F16H 61/20 |
| | | | 477/93 |
| 2005/0184546 A1 | 8/2005 | Kunz et al. | |
| 2006/0113822 A1 | 6/2006 | Kunz | |
| 2006/0125266 A1 | 6/2006 | Kunz | |
| 2006/0167565 A1* | 7/2006 | Katrak | G05B 19/106 |
| | | | 700/12 |
| 2014/0121907 A1 | 5/2014 | Whinnery et al. | |
| 2015/0040700 A1 | 2/2015 | Walls | |
| 2015/0084504 A1 | 3/2015 | Rokenbrodt et al. | |

* cited by examiner

SWITCH OVERRIDE SYSTEM FOR RECREATION VEHICLE CONTROLS

CROSS REFERENCE TO RELATED APPLICATIONS

This is a non-provisional patent application based on U.S. Provisional Application Ser. No. 62/129,130, entitled "RECREATIONAL VEHICLE", filed Mar. 6, 2015 which is incorporated herein by reference.

BACKGROUND OF THE INVENTION

1. Field of the Invention

The present invention relates to recreational vehicles and the control of actuators that move, for example, extendable/retractable elements such as awnings or room slide-outs.

2. Description of the Related Art

In the vehicle industry, it is known to have electrical devices that are connected with devices built into the vehicle. A large segment of the American population owns motor homes, travel trailers, or fifth wheel trailers, broadly referred to herein as recreational vehicles (RVs).

RVs typically include a housing unit mounted on top of a chassis. Also mounted to the chassis is one or more axles with wheels attached thereon so as to allow travel of the RV. The RV can be either pulled by a towing vehicle, or be self-propelled.

Many RVs have an awning that can be deployed when at rest so as to provide a cover from sun and rain. A typical awning is positioned along the side of the RV such that when deployed, it provides a cover from the sun and rain so as to enhance the RV experience.

RVs are known to have rooms that may be extended and retracted. U.S. Pat. No. 6,067,756 issued to Frerichs et al. shows one such room extender. An extended slide-out provides more internal living space for the comfort and convenience of occupants. When the slide-out is retracted the RV then conforms to a street legal width specification and also increases the rigidity and aerodynamic performance of the mobile RV.

The RV may have several rooms which can be expanded with a slide-out system. Each slide-out generally involves a single, integrated structure which can be moved with respect to the vehicle chassis. The movable structure includes a floor, a ceiling, side walls, and an exterior wall which are connected together. The structure is sized and dimensioned so that it can pass through an opening in an exterior wall of the RV, and is motor driven so that it may move outward into the extended position, and inward into a retracted position. U.S. Publication Nos. 2005/0184546, 2006/0125266, and 2006/0113822 all disclose slide-out drive systems that may be used with extendable bay windows within slide-out rooms.

C. T. Yoder, in U.S. Pat. No. 4,500,132, discloses a travel trailer with a slide-out room having a floor, side walls, end wall, and a roof. Movement of the slide-out room between its extended and retracted or travel positions is achieved with an electric motor connected through a gear box to telescopic extension members. The outside wall of the slide-out room is connected to the extension members. The connection includes vertically-adjustable bolt and nut assemblies to vertically position the slide-out room relative to the trailer side wall. D. R. Cooper, in U.S. Pat. No. 5,237,782, discloses a travel trailer with a slide-out room mounted on movable rails. The room and rails are laterally moved with a worm gear driven by an electric motor. The outside wall of the slide-out room has an outwardly-directed peripheral extension supporting a liquid-sealing assembly. The sealing assembly engages an adjacent portion of the trailer side wall to prevent water, snow, and air from flowing into the interior of the trailer when the slide-out room is in the retracted position.

An actuator is often associated with a particular slide out room or awning to facilitate its deployment and stowing. Electrical controls are often used to activate the actuator under the supervision of an operator. Modern electronic interfaces allow for remote operation of the actuators. Sometimes a control fails and a backup operation is needed to move the room or other member.

What is needed in the art is a control system backup to override any other control system that may be coupled to actuators in the RV.

SUMMARY OF THE INVENTION

The present invention provides a system and method of controlling electrical systems in a recreational vehicle.

The invention in one form is directed to a vehicle system including a housing, an extendable/retractable member coupled to the housing, an electrically controlled actuator and an override system. The electrically controlled actuator is connected to the extendable/retractable member, and is configured to extend and retract the extendable/retractable member relative to the housing. The override system includes a selector switch and an activation switch. The selector switch allows a selection of one of the plurality of electrically controlled actuators which is defined as a selected actuator. The activation switch activates the selected actuator to either extend or retract the extendable/retractable member associated with the selected actuator.

The invention in another form is directed to an override system installable in a vehicle system having a housing, an extendable/retractable member coupled to the housing, an electrically controlled actuator and an override system. The electrically controlled actuator is connected to the extendable/retractable member, and is configured to extend and retract the extendable/retractable member relative to the housing. The override system includes a selector switch and an activation switch. The selector switch allows a selection of one of the plurality of electrically controlled actuators which is defined as a selected actuator. The activation switch activates the selected actuator to either extend or retract the extendable/retractable member associated with the selected actuator.

The invention in yet another form is directed to an override method using a switching system in a recreational vehicle having a housing, a plurality of extendable/retractable members coupled to the housing, and a plurality of electrically controlled actuators with a corresponding one of the actuators being connected to each extendable/retractable member. The electrically controlled actuator being configured to extend and retract the extendable/retractable member relative to the housing. The override method includes the steps of electrically selecting one of the plurality of electrically controlled actuators using a selector switch of the switching system, the actuator being defined as a selected actuator; and activating the selected actuator to either extend or retract the extendable/retractable member associated with the selected actuator using an activation switch of the switching system.

An advantage of the present invention is that the override system is hardwired through a switch system to control electrical systems in the RV.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
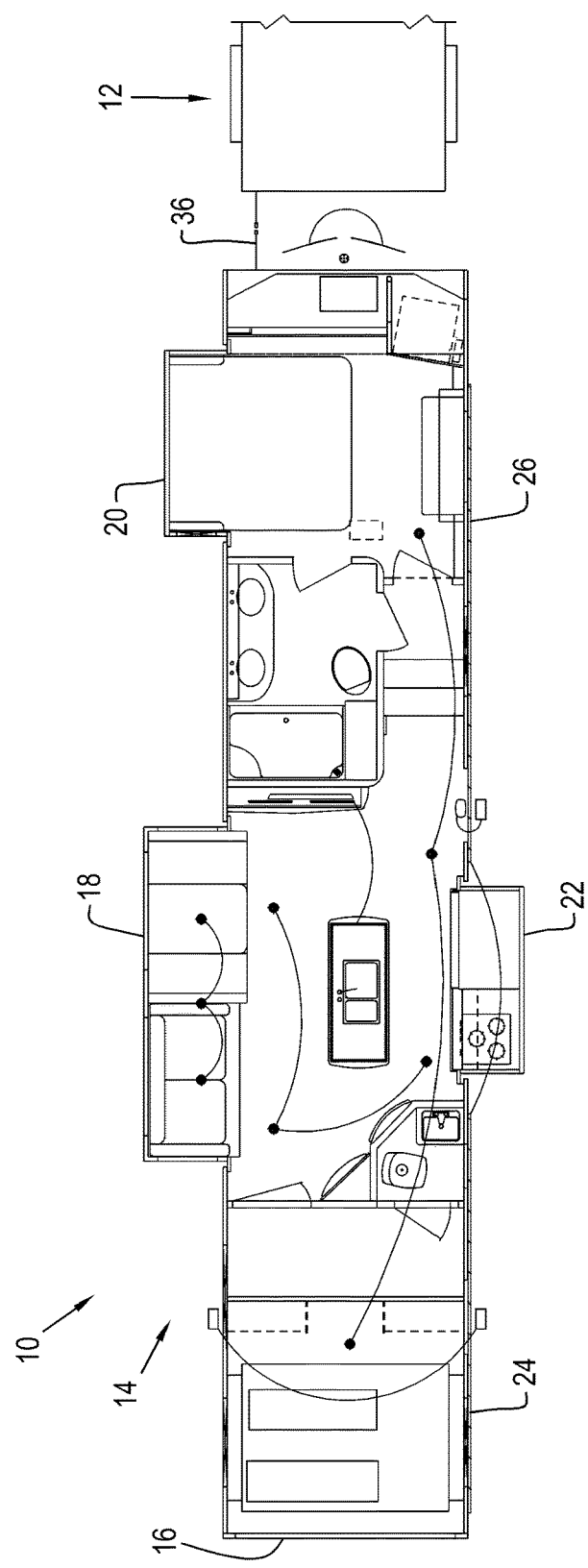
FIG. 1 is a schematical top view of a vehicle system that has an embodiment of a switching system with an override system of the present invention.

Referring now to the drawings, and more particularly to FIG. 1, there is shown a vehicle system 10 having a towing portion 12 and a recreational vehicle (RV) portion 14. Towing portion 12 may be a truck 12 or semi-truck tractor 12; however, for some embodiments of the invention the functions of portions 12 and 14 may be combined as a self-contained RV 10. For some embodiments of the present invention it is assumed that RV portion 14 is detachably connected to truck 12.

RV portion 14 includes a housing 16, extendable room portions 18, 20 and 22, and awnings 24 and 26. Portions 18, 20 and 22, as well as awnings 24 and 26 can be referred to as extendable members 18-26, which are extendable and retractable.

Figure 2:
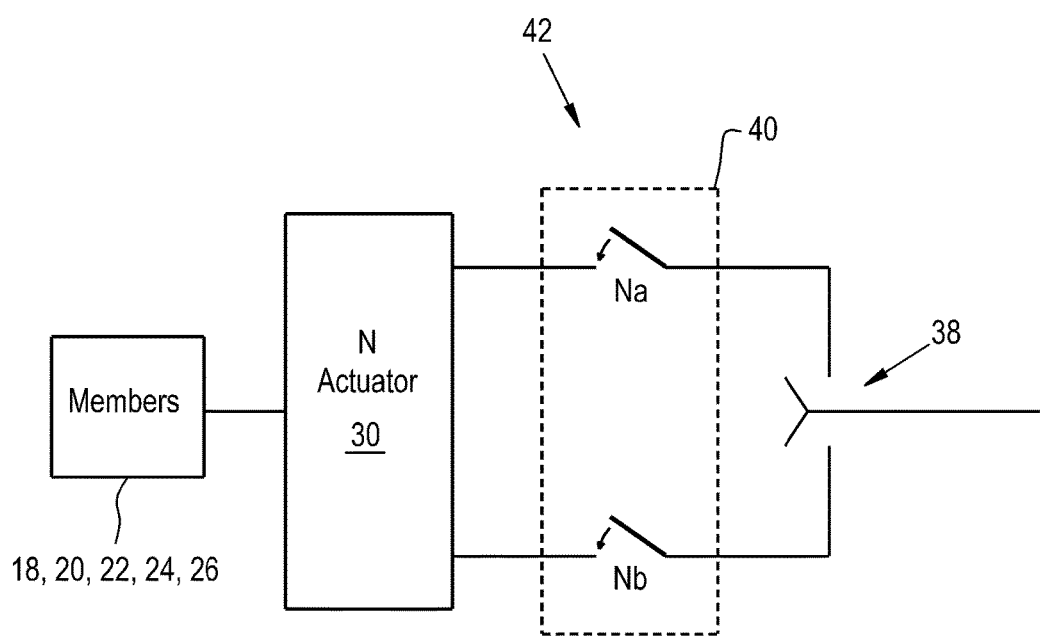
FIG. 2 is a schematical block diagram of elements of the override system that is used with the vehicle system of in FIG. 1.

Now, additionally referring to FIG. 2 there is illustrated in a block diagram form an override system 42 having a selector switch 40 and an activation switch 38, which are electrically couplable to actuators 30. Selector switch 40 is in the form of a rotary switch 40 having at least two normally open contacts for each position that serve to electrically couple a selected N actuator 30 to a toggle switch 38. Toggle switch 38 is illustrated as a three position switch and may be a centrally biased switch.

The present invention allows the controlling of actuators 30 in an override manner using a combination of rotary switches 40 and toggle switches 38 to power actuators 30. This may take place in association with a controller, but in the best embodiment they bypass a controller and function as a failsafe or fall back system allowing the operation of actuators 30 when more automated systems do not work.

Figure 3:
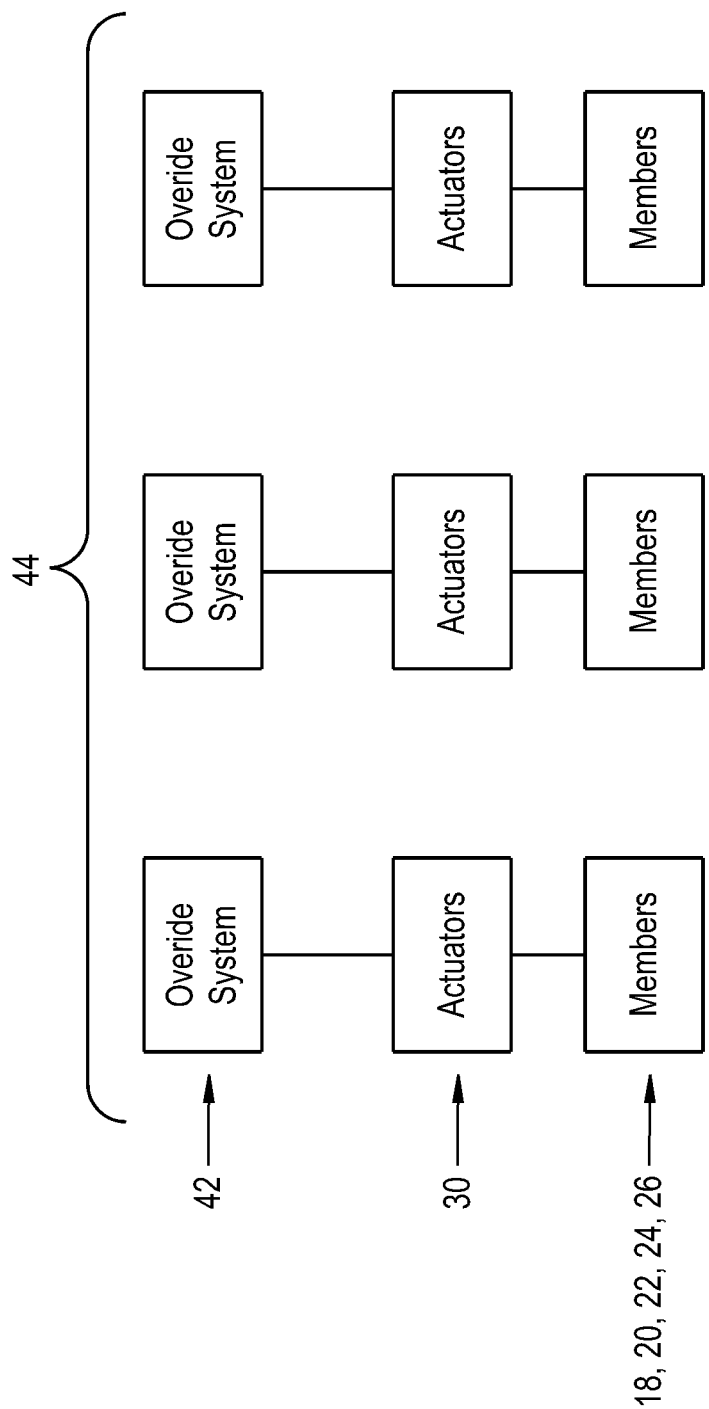
FIG. 3 is a schematical block diagram depicting the switching system used in the vehicle system of FIG. 1 that uses multiple override systems of FIG. 2.

Now, additionally referring to FIG. 3 there is schematically illustrated a switching system 44 that has three override systems 42 that are variously coupled to actuators 30. Additionally, actuators 30, as discussed herein can actually be any electrical system even pumps, and the like, that can be operated by the override systems 42. Toggle switch 38 is neutrally biased so the either one selection or the other can be made, in a momentary fashion, but it is also contemplated that switch 38 can latch into a position. The terminals of toggle switch 38 are electrically coupled to rotary switch 40, which will sequentially connect an actuator N, by way of the rotary position of switch 40 to the terminals of switch 38. This allows the operator to select the actuator N with the rotary switch, then to activate actuator 30 to either extend or retract depending upon the depressing of switch 38 in one direction or the other. While the depiction illustrates a direct electrical connection to actuator 30 it is also contemplated that the connections may be carried out by a controller that reads the position of rotary switch 40 and thereby selects actuator N by way of relays or electronic circuitry.

When rotary switch 40 is in position N contacts Na and Nb are closed and electrical power is then passed through toggle switch 38 when depressed in a particular direction. For example, electrical power can pass through contact Na when toggle switch 38 is moved to contact the conductor depicted above switch 38. This then activates N actuator 30 and hence moving one of members 18, 20, 22, 24 or 26 associated with the selected actuator.

It is also contemplated that override system 42 can disconnect other controls from operating a selected actuator while override system 42 is in control of the actuator.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A vehicle system, comprising:
   a housing;
   a plurality of extendable/retractable members coupled to the housing;
   a plurality of electrically controlled actuators with a corresponding one of the actuators being connected to each extendable/retractable member, the electrically controlled actuator being configured to extend and retract the extendable/retractable member relative to the housing;
   an override system including:
      a selector switch that is positioned to electrically select one of the plurality of electrically controlled actuators being defined as a selected actuator; and
      an activation switch that activates the selected actuator to either extend or retract the extendable/retractable member associated with the selected actuator.

2. The vehicle system of claim 1, wherein the selector switch is a rotary switch.

3. The vehicle system of claim 2, wherein the activation switch is a toggle switch.

4. The vehicle system of claim 3, wherein the toggle switch is a center biased switch.

5. The vehicle system of claim 3, wherein the rotary switch electrically connects the selected actuator to terminals of the toggle switch.

6. The vehicle system of claim 1, further comprising at least one other override system substantially similar to the override system, the other override system being selectively coupled to a first set of the actuators and the override system being selectively coupled to a second set of actuators.

7. The vehicle system of claim 6, wherein the override system and the other override system are proximate to each other.

8. An override system couplable to a recreational vehicle having a housing, a plurality of extendable/retractable members coupled to the housing, and a plurality of electrically controlled actuators with a corresponding one of the actuators being connected to each extendable/retractable member, the electrically controlled actuator being configured to extend and retract the extendable/retractable member relative to the housing, the override system comprising:
- a selector switch that allows a selection of one of the plurality of electrically controlled actuators being defined as a selected actuator; and
- an activation switch that activates the selected actuator to either extend or retract the extendable/retractable member associated with the selected actuator.

9. The override system of claim 8, wherein the selector switch is a rotary switch.

10. The override system of claim 9, wherein the activation switch is a toggle switch.

11. The override system of claim 10, wherein the toggle switch is a center biased switch.

12. The override system of claim 10, wherein the rotary switch electrically connects the selected actuator to terminals of the toggle switch.

13. The override system of claim 8, further comprising at least one other override system substantially similar to the override system, the other override system being selectively coupled to a first set of the actuators and the override system being selectively coupled to a second set of actuators.

14. The override system of claim 13, wherein the override system and the other override system are proximate to each other.

15. An override method using a switching system in a recreational vehicle having a housing, a plurality of extendable/retractable members coupled to the housing, and a plurality of electrically controlled actuators with a corresponding one of the actuators being connected to each extendable/retractable member, the electrically controlled actuator being configured to extend and retract the extendable/retractable member relative to the housing, the override method comprising the steps of:
- electrically selecting one of the plurality of electrically controlled actuators using a selector switch of the switching system, the actuator being defined as a selected actuator; and
- activating the selected actuator to either extend or retract the extendable/retractable member associated with the selected actuator using an activation switch of the switching system.

16. The method of claim 15, wherein the selector switch is a rotary switch.

17. The method of claim 16, wherein the activation switch is a toggle switch.

18. The method of claim 17, wherein the toggle switch is a center biased switch.

19. The method of claim 18, wherein the rotary switch electrically connects the selected actuator to terminals of the toggle switch.

\* \* \* \* \*